United States Patent
Teraoka et al.

(10) Patent No.: US 9,523,402 B2
(45) Date of Patent: Dec. 20, 2016

(54) STAINLESS STEEL BRAKE DISC AND METHOD FOR PRODUCTION THEREOF

(71) Applicant: NIPPON STEEL & SUMIKIN STAINLESS STEEL CORPORATION, Tokyo (JP)

(72) Inventors: Shinichi Teraoka, Tokyo (JP); Yoshiharu Inoue, Tokyo (JP); Yuji Koyama, Tokyo (JP); Masaaki Kobayashi, Tokyo (JP); Toshio Tanoue, Tokyo (JP)

(73) Assignee: Nippon Steel & Sumikin Stainless Steel Corporation, Tokyo (JP)

( * ) Notice: Subject to any disclaimer, the term of this patent is extended or adjusted under 35 U.S.C. 154(b) by 142 days.

(21) Appl. No.: 14/394,624

(22) PCT Filed: Feb. 7, 2014

(86) PCT No.: PCT/JP2014/052947
§ 371 (c)(1),
(2) Date: Oct. 15, 2014

(87) PCT Pub. No.: WO2014/123229
PCT Pub. Date: Aug. 14, 2014

(65) Prior Publication Data
US 2015/0101898 A1   Apr. 16, 2015

(30) Foreign Application Priority Data
Feb. 8, 2013   (JP) .................................. 2013-023415

(51) Int. Cl.
*F16D 65/12* (2006.01)
*C22C 38/00* (2006.01)
(Continued)

(52) U.S. Cl.
CPC ............... *F16D 65/125* (2013.01); *C21D 1/18* (2013.01); *C21D 6/002* (2013.01); *C21D 6/004* (2013.01);
(Continued)

(58) Field of Classification Search
CPC  F16D 65/125; F16D 65/26; F16D 2200/0017; F16D 2200/0004; F16D 2200/0021; F16D 2250/00; C21D 6/002; C21D 9/0068; C21D 1/18; C21D 6/004; C21D 6/005; C21D 6/008; C21D 2211/005; C21D 2211/008; C22C 38/001; C22C 38/02; C22C 38/04; C22C 38/06; C22C 38/54; C22C 38/58; C22C 38/002; C22C 38/00; C22C 38/46; C22C 38/48; C22C 38/50
(Continued)

(56) References Cited

U.S. PATENT DOCUMENTS 4,452,649 A    6/1984  Yoshioka et al.
6,464,803 B1 * 10/2002  Tendo .................... C21D 6/002
                                                148/325
(Continued)

FOREIGN PATENT DOCUMENTS

JP    57-198249 A    12/1982
JP    8-60309 A      3/1996
(Continued)

OTHER PUBLICATIONS

International Search Report for PCT/JP2014/052947 mailed on Apr. 28, 2014.

*Primary Examiner* — Melody Burch
(74) *Attorney, Agent, or Firm* — Birch, Stewart, Kolasch & Birch, LLP

(57) ABSTRACT

The present invention is directed to a stainless steel brake disc which is excellent in toughness, corrosion resistance,
(Continued)

and wear resistance, and comprises, in % by mass, 0.030 to 0.080% of C, 0.05% to 1.0% of Si, 1.0 to 1.5% of Mn, 0.035% or less of P, 0.015% or less of S, 11.0 to 14.0% of Cr, 0.01 to 0.50% of Ni, 0.001 to 0.15% of V, less than 0.1% of Nb, 0.05% or less of Ti, 0.05% or less of Zr, 0.05% or less of Al, 0.015 to 0.060% of N, 0.0002% or more and 0.0050% or less of B, and 0.0080% or less of O, wherein an AT value of equation 1 is 0.055 to 0.090, equation 2 is satisfied, a ferrite phase fraction, in which an IQ value of an EBSD pattern is 4,000 or more, is 1% to 15%, a Charpy impact value is 50 J/cm² or more, and hardness is 32 to 38 HRC.

$$C+0.8(N-B) \quad (1)$$

$$PV=1.2Ti+0.8Zr+Nb+1.1Al+O \leq 0.1 \quad (2)$$

4 Claims, 4 Drawing Sheets

(51) Int. Cl.
  *C22C 38/54* (2006.01)
  *C22C 38/02* (2006.01)
  *C22C 38/04* (2006.01)
  *C22C 38/06* (2006.01)
  *C22C 38/46* (2006.01)
  *C22C 38/48* (2006.01)
  *C22C 38/50* (2006.01)
  *C21D 6/00* (2006.01)
  *C21D 1/18* (2006.01)
  *F16D 69/00* (2006.01)
  *C21D 9/00* (2006.01)

(52) U.S. Cl.
  CPC .............. *C21D 6/005* (2013.01); *C21D 6/008* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/46* (2013.01); *C22C 38/48* (2013.01); *C22C 38/50* (2013.01); *C22C 38/54* (2013.01); *C21D 9/0068* (2013.01); *C21D 2211/005* (2013.01); *C21D 2211/008* (2013.01); *F16D 2200/0021* (2013.01); *F16D 2250/00* (2013.01)

(58) Field of Classification Search
  USPC .......... 188/218 XL; 148/325; 420/38, 69, 70
  See application file for complete search history.

(56) References Cited

U.S. PATENT DOCUMENTS

| | | | |
|---|---|---|---|
| 6,884,388 B2* | 4/2005 | Ozaki | .................. C22C 38/001 |
| | | | 148/325 |
| 8,333,849 B2* | 12/2012 | Yamauchi | ............. C22C 38/001 |
| | | | 148/325 |
| 2004/0096352 A1 | 5/2004 | Ozaki et al. | |
| 2008/0000737 A1* | 1/2008 | Hirasawa | ............... F16D 65/125 |
| | | | 188/218 XL |
| 2009/0104068 A1 | 4/2009 | Hirasawa et al. | |
| 2009/0162240 A1* | 6/2009 | Hirasawa | ................. C21D 9/46 |
| | | | 420/61 |
| 2012/0125724 A1 | 5/2012 | Yamauchi et al. | |
| 2013/0039801 A1* | 2/2013 | Tsuge | .................... C22C 38/001 |
| | | | 420/38 |
| 2014/0000769 A1 | 1/2014 | Takahashi et al. | |

FOREIGN PATENT DOCUMENTS

| | | |
|---|---|---|
| JP | 2001-220654 A | 8/2001 |
| JP | 2002-146488 A | 5/2002 |
| JP | 2005-133204 A | 5/2005 |
| JP | 2006-322071 A | 11/2006 |
| JP | 2007-247027 A | 9/2007 |
| JP | 2011-12343 A | 1/2011 |
| KR | 10-0717506 B1 | 5/2007 |
| WO | WO 2012/128228 A1 | 9/2012 |

* cited by examiner

US 9,523,402 B2

STAINLESS STEEL BRAKE DISC AND METHOD FOR PRODUCTION THEREOF

TECHNICAL FIELD

The present invention relates to a brake disc for a two-wheeled vehicle and a method for production thereof, and also relates to a brake disc for a two-wheeled vehicle, which is comparatively low cost and is excellent in corrosion resistance, toughness, and wear resistance.

BACKGROUND ART

It is required for a brake disc for a two-wheeled vehicle to have properties such as wear resistance, rust resistance, and toughness. Usually, wear resistance enhances as hardness increases. Meanwhile, since too high hardness may cause so-called brake squeal between a brake and a pad, brake the hardness of 32 to 38 HRC (Rockwell hardness C-scale) is required. Due to these demanded properties, a martensitic stainless steel sheet is used as a brake disc for a two-wheeled vehicle.

Heretofore, SUS420J2 has been quenched and tempered to control to the desired hardness thus fabricating a brake disc and, in this case, there was a problem that two heat treatment processes including quenching and tempering processes are required. Meanwhile, Patent Literature 1 disclosed an invention relating to a steel composition, which is capable of stably obtaining the desired hardness at a wider quenching temperature range than a conventional steel of a SUS420J2 steel, and is also used in the as-quenched state. This is the invention that the (C+N) content is reduced and also narrowing of the austenitizing temperature range caused thereby, in other words, narrowing of the quenching temperature range is compensated by the addition of Mn as an austenite forming element. Patent Literature 2 also discloses an invention relating to a steel sheet for motorbike disc brake, which is a low Mn steel and is used in the as-quenched state. This steel sheet is obtained by adding Ni and Cu as an austenite forming element which has the same effect as that of Mn, in place of reducing the content of Mn.

In recent days, it has also been required for a two-wheeled vehicle to reduce the weight of a vehicle body, and a study on reduction of the weight of a brake disc for a two-wheeled vehicle has been made. In this case, disc deformation due to disc material softening caused by heat generation at the time of braking will be a future problem, and there is a need to improve heat resistance of the disc material so as to solve such problem. One of solutions thereof is an improvement in temper softening resistance, and Patent Literature 3 disclosed an invention relating to a method for improving heat resistance by the addition of Nb, Mo, or the like. Patent Literature 4 discloses an invention relating to a disc material having excellent heat resistance in which a quenching treatment is performed by quenching from a temperature higher than 1,000° C. Patent Literature 5 discloses, as a brake disc having excellent temper softening resistance, a brake disc having a martensite structure in which a prior austenite grain has an average grain size of 8 μm or more, and Patent Literature 6 discloses an invention in which martensite accounts for 75% or more of an area ratio of a quenched structure and the Nb content is 0.10% or more and 0.60% or less.

CITATION LIST

Patent Literature

[Patent Literature 1]
  Japanese Unexamined Patent Publication (Kokai) No. 57-198249
[Patent Literature 2]
  Japanese Unexamined Patent Publication (Kokai) No. 8-60309
[Patent Literature 3]
  Japanese Unexamined Patent Publication (Kokai) No. 2001-220654
[Patent Literature 4]
  Japanese Unexamined Patent Publication (Kokai) No. 2005-133204
[Patent Literature 5]
  Japanese Unexamined Patent Publication (Kokai) No. 2006-322071
[Patent Literature 6]
  Japanese Unexamined Patent Publication (Kokai) No. 2011-12343

SUMMARY OF INVENTION

Technical Problem

However, in order to obtain high heat resistance, high quenching toughness, and high heat resistance, an increase in amount of alloy elements added and an increase in retention time at a heating temperature of the quenching become necessary, leading to an increase in alloy cost and production cost. In many cases, it was difficult to quantificate a quenched structure by a prior austenite grain size or a martensite phase fraction using an optical microscope, and there is a difficulty in performing quality control.

An object of the present invention is to provide a brake disc which is excellent in toughness, corrosion resistance, and wear resistance, together with design of component, design of heating condition of quenching, and structure evaluation technology thereof, on the premise of high-efficiency quenching conditions of a brake disc.

Solution to Problem

The present inventors have intensively studied an influence of heating conditions of quenching, structures, and components on toughness of a low carbon martensitic stainless steel. First, an examination was made of an influence of a heating time of quenching at 950° C. to a 12% Cr-1.1% Mn-0.06% C-0.01% N steel on surface hardness (hereinafter sometimes referred to as quenched hardness) and toughness of steel after quenching. The horizontal axis of FIGS. 1(a) and 1(b) shows a heating time of quenching (seconds), the vertical axis of FIG. 1(a) shows quenched hardness, and the vertical axis of FIG. 1(b) shows toughness. As shown in FIG. 1(b), it has been found that toughness deteriorates when the heating time of quenching is prolonged.

It is considered that such deterioration of toughness occurs due to a change in quenched structure. However, the method of Patent Literature 5 was not capable of discriminating austenite grain boundaries, and also method of Patent Literature 6 was not capable of clearly distinguishing martensite from ferrite, thus failing to measure a martensite fraction.

Thus, an electron backscatter diffraction method (EBSD) was applied as a method for quantification of a structure. The measurement of a phase fraction of two phases each having a different crystal structure is usually performed using EBSD and, for example, the measurement of a phase fraction of ferrite and austenite in a two-phase stainless steel is performed. Since ferrite and martensite have similar crystal structure in a quenched structure of a low carbon martensitic stainless steel, it is difficult to make a distinction by a conventional method. The present inventors made an attempt of distinguishing martensite from ferrite by use of an image quality (IQ) value of an EBSD pattern, and made an assumption that a structure having an IQ value of 4,000 or more is ferrite. In other words, they assumed that a martensite phase having high dislocation density causes a decrease in IQ value because of including turbulence of a crystal structure, while a ferrite phase causes an increase in IQ value because of low dislocation density. FIG. 2 shows an IQ mapping image measured using a sample quenched after storage at 950° C. for 5 second in a test for obtaining the results shown in FIG. 1 mentioned above. In a grey scale photograph on the left side of FIG. 2, a structure having high IQ value is observed in a stripe shape. The IQ value is binarized by a value of 4,000 or more and a value of less than 4,000 (photograph of the right side of FIG. 2) and an area ratio of 4,000 or more was determined. As a result, it was 3.4%. Accordingly, regarding a test sample of FIG. 1, an area ratio having an IQ value of 4,000 or more determined by IQ mapping is regarded as a ferrite phase fraction, and an influence of the ferrite phase fraction on toughness after quenching was examined. FIG. 3 shows a comparison between an area ratio (%) where the IQ value obtained from a test sample of FIG. 1 is 4,000 or more, and a Charpy impact value in FIG. 1(b). It has been found that a ferrite phase fraction exerts a significant influence on toughness after quenching, and a Charpy impact value becomes 50 J/cm$^2$ or more at 1% or more, thus exhibiting satisfactory toughness.

However, there is a concern that an increase in ferrite fraction for the purpose of improving toughness after quenching may cause deterioration of corrosion resistance and quenched hardness. The inventors have found that N effectively acts as a result of a research of seeds capable of improving corrosion resistance and hardenability in a two phase structure of ferrite and martensite. FIG. 4 is a graph showing the evaluation results of corrosion resistance and quenched hardness of the C steel when the N content of the 12% Cr-1.1% Mn-0.06% C steel used in the test sample of the above-mentioned FIG. 1 was changed and quenching was performed at a ferrite phase fraction of 5%. The quenched hardness (hardness HRc) in FIG. 4(a) was evaluated in terms of Rockwell hardness C-scale after polishing a sample surface, and the corrosion resistance (rust area ratio (%)) in FIG. 4(b) was evaluated by performing a salt spray test defined in JISZ2371 "Procedure for Salt Spray Test" for 4 hours after final polishing (#600) of a surface. It has been found that satisfactory corrosion resistance and quenched hardness can be obtained in two phase structure of ferrite and martensite by controlling the N content to 0.015% or more even if the ferrite phase fraction is 5%. It has also been found that a rust area ratio (%) becomes 10% or less by controlling the N content to 0.015% or more, thus improving corrosion resistance. Meanwhile, when the N content is controlled to 0.08%, corrosion resistance deteriorates due to defects caused by bubbles, leading to a rust area ratio of 40%.

On the basis of these findings, it became possible to provide a brake disc which is excellent in toughness after quenching and is also excellent in corrosion resistance and quenched hardness, together with structure control and evaluation technology thereof.

The present invention has been completed based on these findings, and solutions to problem of the present invention, in other words, a stainless steel brake disc and a method for production thereof by using a ferritic stainless steel sheet of the present invention are as follows.

(1) A stainless steel brake disc comprising, in % by mass, 0.030 to 0.080% of C, 0.05% to 1.0% of Si, 1.0 to 1.5% of Mn, 0.035% or less of P, 0.015% or less of S, 11.0 to 14.0% of Cr, 0.01 to 0.50% of Ni, 0.001 to 0.15% of V, less than 0.1% of Nb, 0.05% or less of Ti, 0.05% or less of Zr, 0.05% or less of Al, 0.015 to 0.060% of N, 0.0002% or more and 0.0050% or less of B, and 0.0080% or less of O, wherein an AT value of equation 1 is 0.055 or more and 0.090 or less, equation 2 is satisfied, the balance is Fe and inevitable impurities, a ferrite phase fraction, defined by the fact that an image quality value of an EBSD pattern is 4,000 or more, is 1% or more and 15% or less, and surface hardness is 32 HRC or more and 38 HRC or less:

$$AT=C+0.8(N-B) \tag{1}$$

$$PV=1.2Ti+0.8Zr+Nb+1.1Al+O \leq 0.1 \tag{2}$$

where N, B, Ti, Zr, Nb, Al, and O in equation 1 and equation 2 each means the element content (% by mass).

(2) The stainless steel brake disc according to (1), further comprising, in % by mass, one, or two or more kinds of 1.0% or less of Cu, 0.5% or less of Mo, 0.3% or less of Sn, 0.3% or less of Sb, 0.2% or less of REM, and 0.3% or less of Ga.

(3) A method for producing a stainless steel brake disc, which comprises heating a stainless steel brake disc comprising, in % by mass, 0.030 to 0.080% of C, 0.05% to 1.0% of Si, 1.0 to 1.5% of Mn, 0.035% or less of P, 0.015% or less of S, 11.0 to 14.0% of Cr, 0.01 to 0.50% of Ni, 0.001 to 0.15% of V, 0.10% or less of Nb, 0.05% or less of Ti, 0.05% or less of Zr, 0.05% or less of Al, 0.015 to 0.060% of N, 0.0002% or more and 0.0050% or less of B, and 0.0080% or less of O, wherein an AT value of equation 1 is 0.055 or more and 0.090 or less, equation 2 is satisfied, and the balance is Fe and inevitable impurities, to a temperature of 950° C. or more and 1,050° C. or lower; retaining at the heating temperature for more than 0.1 second and 5 seconds or less, followed quenching; and setting a duration from the start of heating up to the start of cooling at 50 seconds or less:

$$AT=C+0.8(N-B) \tag{1}$$

$$PV=1.2Ti+0.8Zr+Nb+1.1Al+O \leq 0.1 \tag{2}$$

where N, B, Ti, Zr, Nb, Al, and O in equation 1 and equation 2 each means the element content (% by mass).

(4) The method for producing the stainless steel brake disc according to (3), wherein the stainless steel further comprises, in % by mass, one, or two or more kinds of 1.0% or less of Cu, 0.5% or less of Mo, 0.3% or less of Sn, 0.3% or less of Sb, 0.2% or less of REM, and 0.3% or less of Ga.

Advantageous Effects of Invention

According to the structure and composition control technology of the present invention, it becomes possible to obtain a brake disc which has excellent toughness and excellent corrosion resistance, and also has excellent wear resistance obtained by controlling quenched hardness within a defined range. Quality thereof is preferable from the viewpoint of safety and decorativeness.

DESCRIPTION OF EMBODIMENTS

Figure 1A:
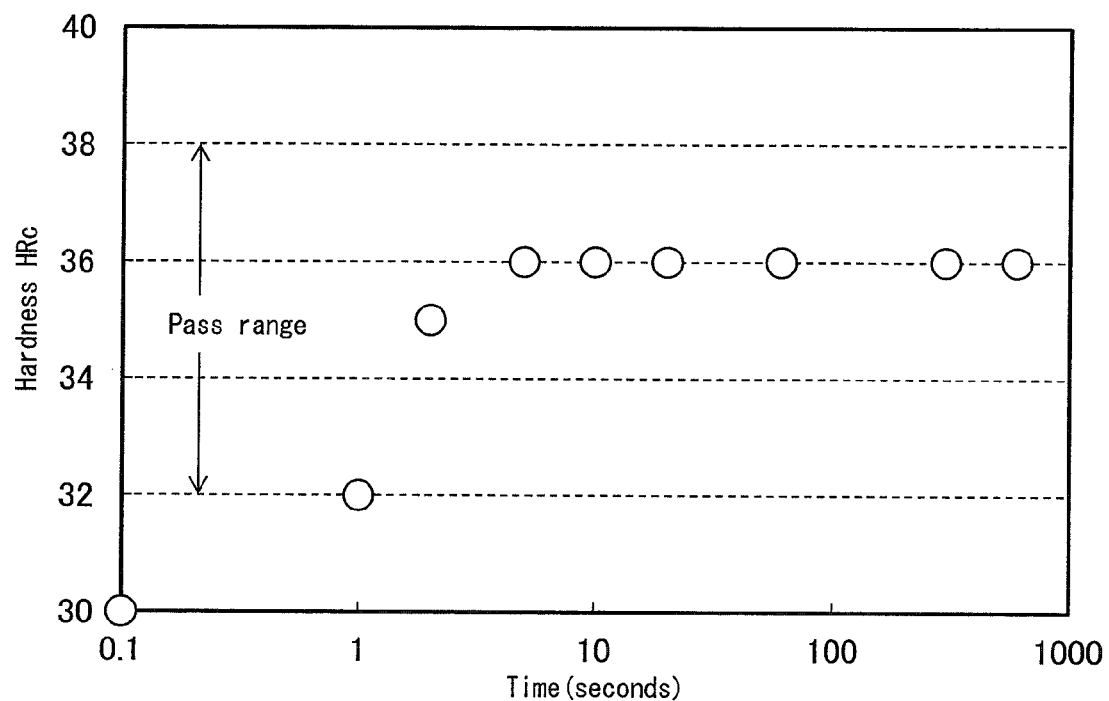
FIG. 1 is a graph showing a relationship among the retention time at a heating temperature (heating time of quenching), the quenched hardness (hardness HRc) in FIG. 1(a), and the toughness (Charpy impact value) in FIG. 1(b) when a 3.0 mm thick hot rolled and annealed sheet of a martensitic stainless steel in the present embodiment is heated at an average heating rate of 50° C./s using a high frequency induction heating device, retained at 950° C. for 1 second to 10 minutes, and quenched by cooling at a cooling rate of 100° C./s, and then a Charpy impact test piece was made from a subsize test piece having the sheet thickness as is and a test was performed at a normal temperature.
Figure 1B:
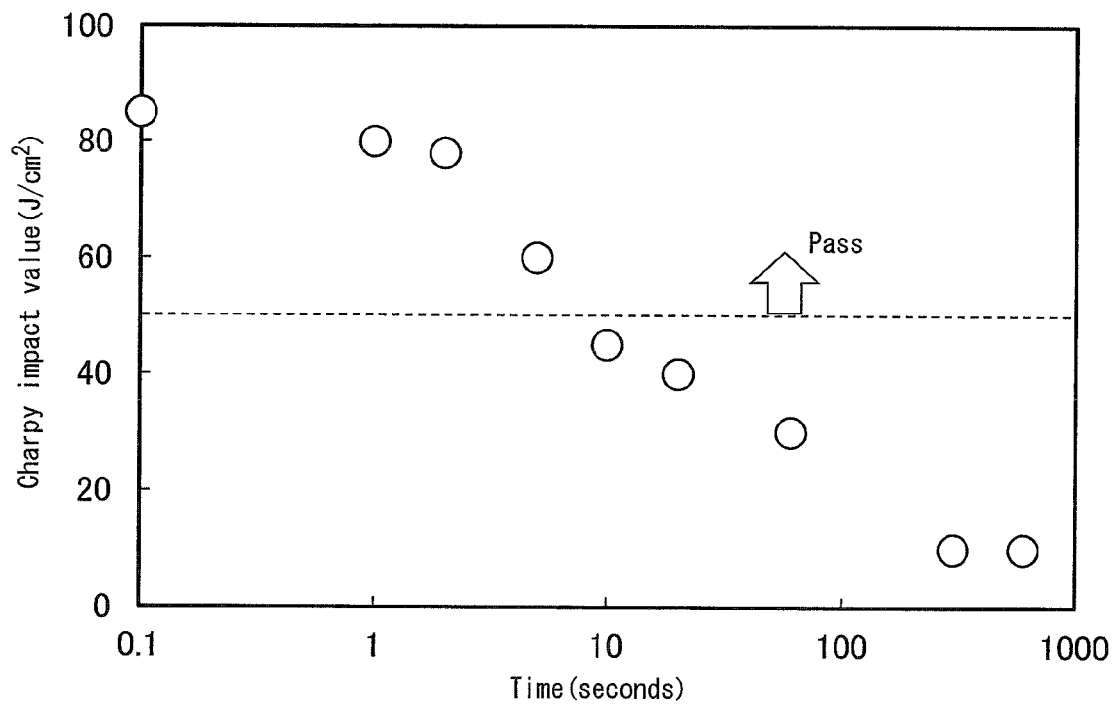
Figure 2:
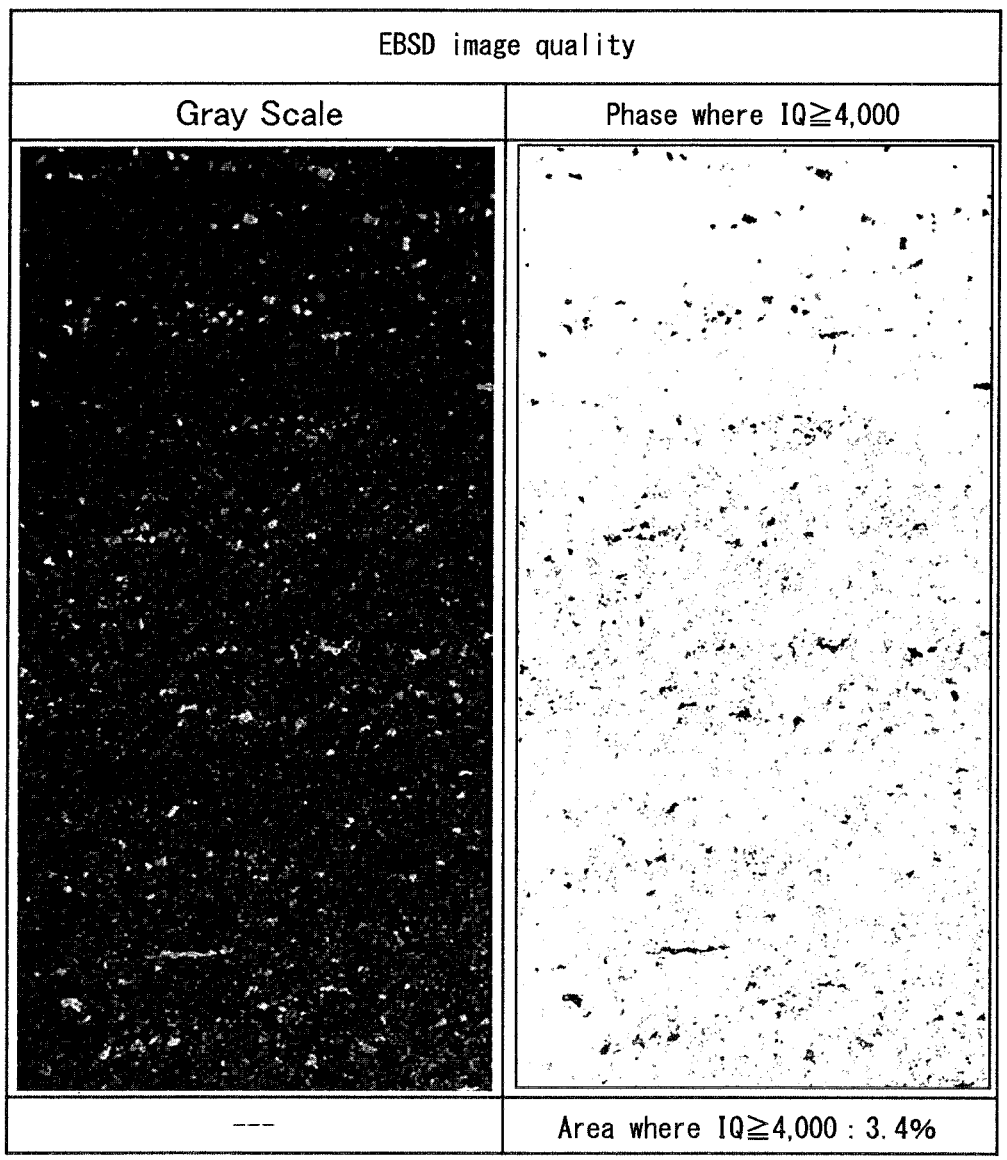
FIG. 2 is a graph in which a martensitic stainless steel in the present embodiment is heated at an average heating rate of 50° C./s using a high frequency induction heating device, retained at 950° C. for 5 seconds and then quenched by cooling at a cooling rate of 100° C./s to obtain the quenched material, and a EBSD pattern of a cross section structure of the quenched material was measured by an EBSD device and the EBSD pattern thus obtained was subjected to IQ mapping and, finally, the results thus obtained are indicated by gray scale and are further binarized by a value of 4,000 or more and a value of less than 4,000 and are shown as a graph.
Figure 3:
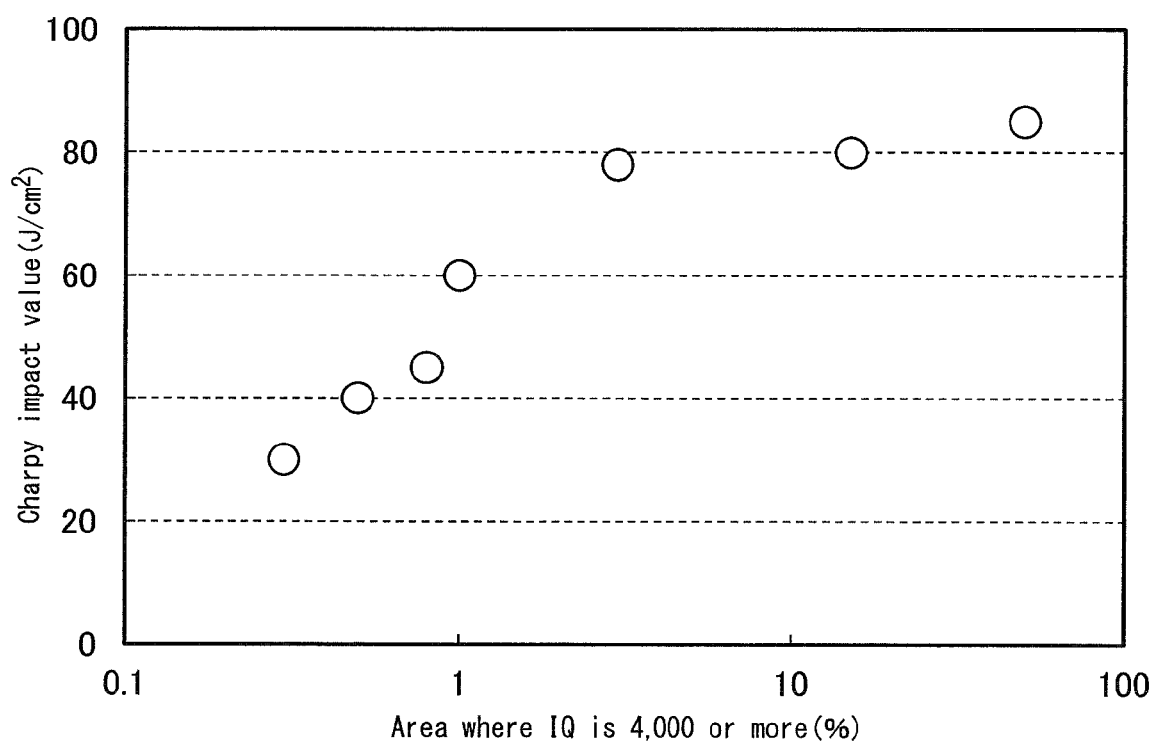
FIG. 3 is a graph showing a relationship between the ferrite fraction and the toughness, which has been found by subjecting the quenched sample shown in FIG. 1 to EBSD mapping using the method mentioned in the description of FIG. 2, and measuring a ferrite fraction.

Embodiments of the present invention will be described below. First, the reason why the steel composition of a stainless steel sheet of the present embodiment is limited will be described. Unless otherwise specified, percentages with respect to the composition are by mass.

C: 0.030 to 0.080%

C is an essential element, necessary to obtain the predetermined hardness after quenching, and is added in combination with N so as to achieve the predetermined hardness level. In order to make the best use of the effect of N while avoiding excessive addition of C, the upper limit is set at 0.08% in the present invention. The reason is that excessive addition leads to excessive hardness, thus causing failures such as brake squeal and deterioration of toughness. From the view point of control of hardness and improvement in corrosion resistance, the upper limit is desirably 0.060%. On the other hand, when the content of C is less than 0.030%, excessive addition of N is required so as to obtain hardness, and so the lower limit is set at 0.030%. In view of stability of quenched hardness, the lower limit is desirably set at 0.040% or more.

Si: 0.05% to 1.0%

Si is necessary for deoxidation at the time of melting and refining process, and is also useful to suppress formation of oxidized scale at the time of heat treatment of quenching and the effect is exerted at 0.05% or more, thus setting at 0.05% or more. However, since Si is mixed from a raw material such as molten iron, excessive reduction leads to cost increase, thus desirably setting at 0.10% or more. Si narrows the austenite single phase temperature range to cause deterioration of quenching stability, thus setting at 1.0% or less. In order to reduce cost by reducing the additive amount of an austenite stabilizing element, the content is desirably 0.60% or less.

Mn: 1.0 to 1.5%

Mn is an element to be added as a deoxidizing agent, and also enlarge the austenite single phase region, thus contributing to an improvement in hardenability. The effect is clearly exerted at 1.0% or more, thus setting at 1.0% or more. In order to stably ensure hardenability, the content is desirably set at 1.1% or more. However, Mn promotes formation of oxidized scale at the time of heating of quenching and increases subsequent polishing burden, thus setting the upper limit at 1.5% or less. Taking deterioration of corrosion resistance caused by sulfide such as MnS into consideration, the upper limit is desirably 1.3% or less.

P: 0.035% or less

P is an element contained, as impurities, in a raw material such as molten iron, a main raw material such as ferrochromium, and the like. It is a harmful element to a hot rolled and annealed sheet and toughness after quenching, thus setting at 0.035% or less. The content is preferably 0.030% or less. Excessive reduction essentially requires use of a high purity raw material, leading to cost increase, and thus the lower limit of P is preferably 0.010%.

S: 0.015% or less

Since S forms sulfide inclusions and causes deterioration of general corrosion resistance (general corrosion or pitting) of a steel material, the upper limit of the content is preferably as small as possible and the upper limit is set at 0.015%. The smaller the content of S, the more corrosion resistance becomes satisfactory. S content reduction causes an increase in desulfurization burden and an increase in production cost, and thus it is desired that the lower limit is set at 0.001% and the upper limit is set at 0.008%.

Cr: 11.0 to 14.0%

Cr is an essential element for ensuring oxidation resistance and corrosion resistance in the present invention. The content of less than 11.0% does not exert these effects, while the content of more than 14.0% narrows the austenite single phase region to impair hardenability, and thus setting at 11.0 to 14.0%. Taking stability of corrosion resistance and press formability into consideration, it is desired that the lower limit is set at 12.0% and the upper limit is set at 13.0%.

Ni: 0.01 to 0.50%

Ni is mixed, as inevitable impurities, in an alloy raw material of a ferritic stainless steel, and is usually contained within a range of 0.01 to 0.10%. It is also an element effective for suppression of the progress of pitting corrosion, and the effect is stably exerted by the addition of 0.05% or more of N, and thus the lower limit is preferably set at 0.05%. Meanwhile, a large amount of addition may cause deterioration of press formability due to solid-solution hardening in a hot rolled and annealed sheet, thus setting the upper limit as 0.5%. Taking alloy cost into consideration, it is desired that the lower limit is set at 0.03 and the upper limit is set at 0.15%.

V: 0.001 to 0.15%

V is mixed, as inevitable impurities, in an alloy raw material of a ferritic stainless steel, and is not easy to remove in refining process, and thus it is generally contained within a range of 0.001 to 0.15%. V is also an element which has the effect of forming fine carbonitride to improve wear resistance of a brake disc, and is intentionally added, as needed. Since the effect is stably exerted by the addition of 0.02% or more of V, the lower limit is preferably set at 0.02%. Meanwhile, excessive addition may cause coarsening of the precipitate, leading to deterioration of toughness after quenching, thus setting the upper limit at 0.15%. Taking production cost and manufacturability into consideration, it is desired that the lower limit is set at 0.03% and the upper limit is set at 0.08%.

Nb: 0.10% or less

Nb is an element which forms carbonitride and so suppresses sensitization and deterioration of corrosion resistance due to precipitation of chromium carbonitride in a stainless steel. However, squeaking is likely to occur in a brake disc, and fracture of large-sized inclusions as a starting point may cause deterioration of toughness, thus setting at 0.10% or less. Considering toughness during the winter season into consideration, the content is desirably set at 0.01% or less. However, Nb may not be contained.

Ti: 0.05% or less

Like Nb, Ti is an element which forms carbonitride and so suppresses sensitization and deterioration of corrosion resistance due to precipitation of chromium carbonitride in a stainless steel. However, like Nb, formation of large-sized inclusions may cause an improvement in toughness and squeaking in a brake disc, and thus the upper limit is set at 0.05% or less. Taking toughness during the winter season into consideration, the content is desirably set at 0.03% or less. In the present invention, for the purpose of improving toughness, the content of Ti is desirably set at 0.02% or more and 0.03% or less. However, Ti may not be contained.

Zr: 0.05% or less

Like Nb, Ti, or the like, Zr is an element which forms carbonitride and so suppresses formation of Cr carbonitride, thus improving corrosion resistance. The effect of improving toughness is exerted when the content of Zr is approximately 0.005%. Meanwhile, like Nb, Ti, or the like, Zr forms large-sized inclusions to cause an improvement in toughness and squeaking in a brake disc, and thus the upper limit is set at 0.05% or less. Taking toughness during the winter season into consideration, the content is desirably set at 0.03% or less. However, Zr may not be contained.

Al: 0.05% or less

Al is an element which is added as a deoxidizing element, and also improves oxidation resistance. The effect can be obtained when the content is 0.001% or more, and thus the lower limit is preferably set at 0.001% or more. Meanwhile, solid-solution hardening and formation of large-sized oxide-based inclusions may cause deterioration of toughness of a brake disc, and thus the upper limit is set at 0.05% or less.

It is desirable that the upper limit is preferably set at 0.03% or less. Al may not be contained.

B: 0.0002% or more and 0.0050% or less

B is an element which is effective to improve hot workability, and the effect is exerted when the content is 0.0002% or more, thus setting at 0.0002% or more. In order to improve hot workability in a wider temperature range, the content is desirably set at 0.0010% or more. Meanwhile, excessive addition causes deterioration of hardenability due to composite precipitation of boride and carbide, and thus the upper limit is set at 0.0050%. Taking corrosion resistance into consideration, the content is desirably 0.0025% or less.

O: 0.0080% or less

O is inevitably contained in the form of an oxide, and is preferably reduced. However, excessive reduction leads to the addition of a lot of deoxidizing elements and prolonging of the refining time, resulting in cost increase, and thus the upper limit was set at 0.0080%. Taking deterioration of press formability due to an oxide as a starting point, and deterioration of toughness of a brake disc into consideration, the content is 0.0010% or more, and desirably 0.0070% or less.

N: 0.015 to 0.060%

N is one of very important elements in the present invention. Like C, N is an essential element for obtaining the predetermined hardness after quenching, it is added in combination with C so as to attain the predetermined hardness level. In order to control the quenched hardness to 32 HRC or more, there is a need to set the N content at 0.015% or more. Meanwhile, when the N content exceeds 0.06%, quenched hardness exceeds 38 HRC to cause brake squeal. Therefore, from the viewpoint of quenched hardness, the upper limit of the N content is set at 0.06%.

Figure 4A:
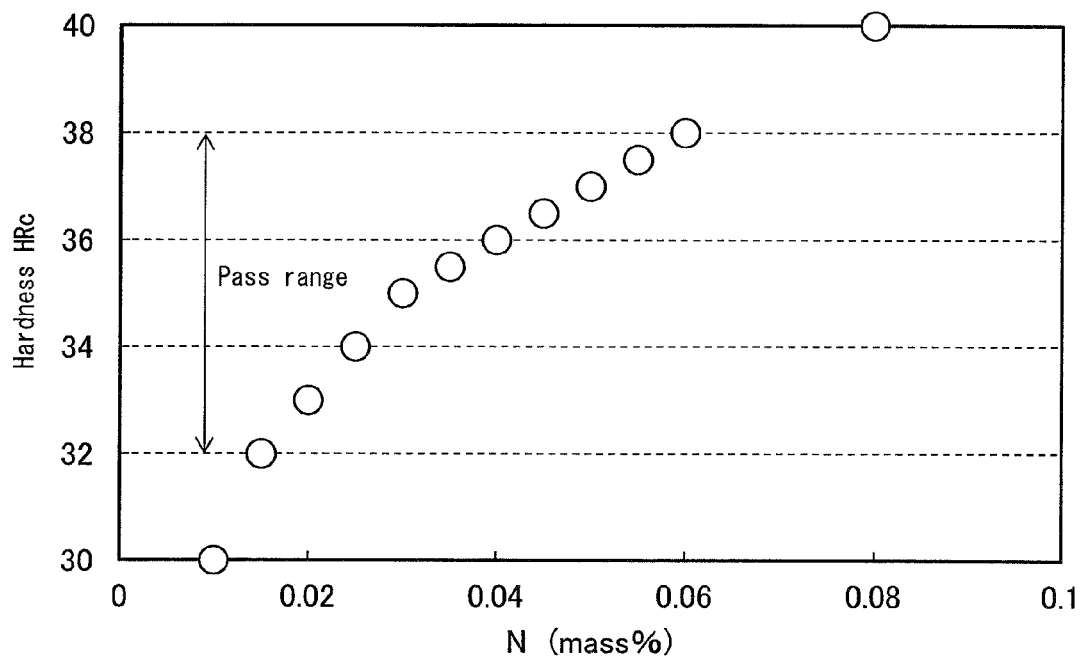
FIG. 4 is a graph showing an influence of the N content on quenched hardness in FIG. 4(a) and corrosion resistance in FIG. 4(b), which has been found by raising the temperature of a 3.0 mm thick hot rolled and annealed sheet of each of a martensitic stainless steel of the present embodiment and a comparative martensitic stainless steel at an average heating rate of 50° C./s using a high frequency induction heating device, controlling a heating temperature and a retention time within a range of 950 to 1,050° C. and 0 to 5 seconds so that a ferrite phase fraction exhibiting an image quality value, which is obtained by IQ mapping of a EBSD pattern of a cross section structure in the quenched sample, of 4,000 or more is unified to 5%, quenching through cooling at a cooling rate of 100° C./s, measuring corrosion resistance using a salt spray test, and measuring surface hardness using a Rockwell C scale hardness tester.
Figure 4B:
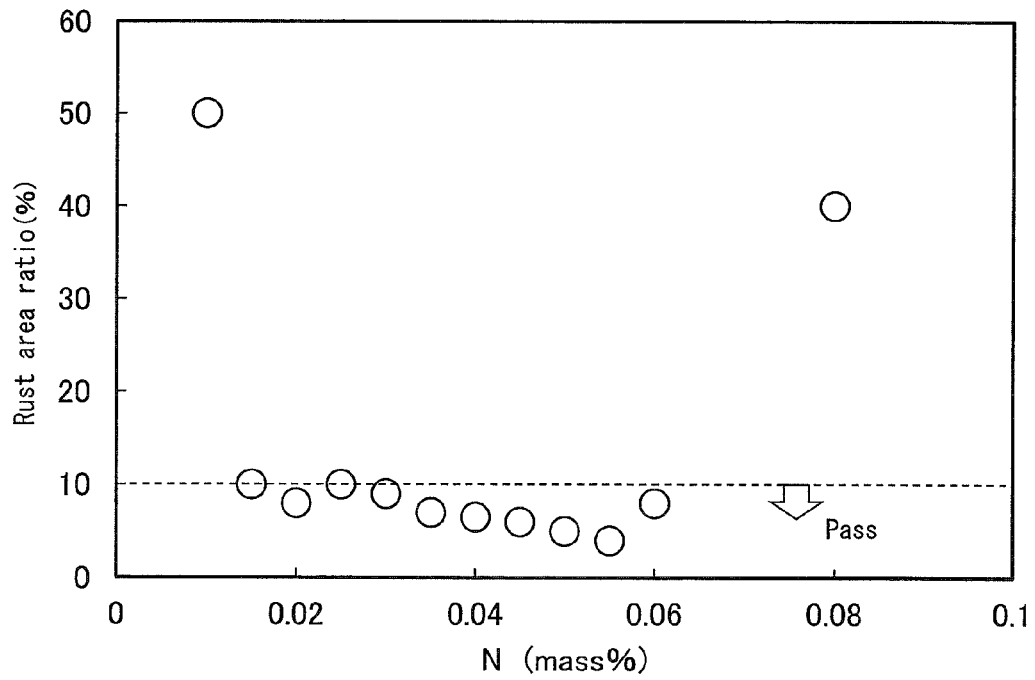

In the case of quenching as a two phase structure of austenite and ferrite at the time of heating of quenching, precipitation of Cr carbide, in other words, a sensitization phenomenon is likely to occur, leading to deterioration of corrosion resistance. However, the addition of nitrogen enables suppression of precipitation of Cr carbide, thus exerting the effect of improving corrosion resistance. Since the effect is exerted when the N content is 0.015% or more, the lower limit of the N content is set at 0.015% from the viewpoint of corrosion resistance. Taking the effect of improving corrosion resistance by strengthening a passivation film into consideration, the lower limit is desirably set at 0.030%. On the other hand, since the yield may decrease due to formation of defects caused by bubbles, the upper limit is set at 0.060%. As shown in FIG. 4(b), from the viewpoint of surely reducing a rust area ratio to less than 10% to further ensure the effect of improving corrosion resistance, it is more desired that the lower limit of the N content is set at 0.035% and the upper limit of the N content is set at 0.055%.

As mentioned above, from the viewpoint of imparting excellent corrosion resistance and quenched hardness within a defined range to a brake disc, the N content is set within a range of 0.015% or more and 0.06% or less. In particular, taking the viewpoint of the effect of improving corrosion resistance into consideration, the N content is preferably within a range of 0.030% or more and 0.06% or less, and more preferably within a range of 0.035% or more and 0.055% or less.

Quenched Hardness of 32 HRC or More and 38 HRC or Less

The quenched hardness is controlled to 32 HRC or more so as to improve wear resistance of a brake disc. Too high hardness may cause squeaking at the time of braking, thus controlling to 38 HRC or less. Taking a drop in lifetime due to sliding wear into consideration, it is desired to control to 33 HRC or more and 37 HRC or less.

A phase fraction, in which an IQ value of EBSD is 4,000 or more, is set at 1% or more and 15% or less.

The structure, in which an IQ value determined by mapping of EBSD is 4,000 or more, is presumed to be a ferrite structure, and a ferrite structure exerts a significant influence on toughness of a brake disc, while too small phase fraction causes deterioration of toughness, thus setting at 1.0% or more. On the other hand, when the phase fraction having an IQ value of 4,000 or more increases, quenched hardness decreases, thus setting the upper limit at 15% or less. Taking quenched hardness and stabilization of corrosion resistance into consideration, it is desired that the phase fraction in which an IQ value of EBSD is 4,000 or more is controlled to 2% or more and 10% or less.

$$AT=C+0.8(N-B) \quad \text{(equation 1);}$$

0.055≤AT≤0.090

It is important to control the C and N contents, which determine hardness of martensite, so as to obtain the targeted quenched hardness. N exerts less influence on hardness of martensite than C, but has the effect of promoting transformation from ferrite to austenite to enhance hardness after quenching. Even under heating conditions of quenching, B has a function of forming stable nitride and carbide to reduce quenched hardness. Therefore, when the AT value of equation 1 is less than 0.055, there is a need to prolong heating and holding time to increase a martensite fraction so as to obtain quenched hardness of 32 HRC, leading to deterioration of toughness after quenching. Therefore, the lower limit of the AT value is set at 0.050, and preferably 0.060 or more. On the other hand, when the AT value exceeds 0.090, quenched hardness exceeds 38 HRC, thus causing deterioration of quenching toughness, or squeaking of a brake disc. Therefore, the upper limit of the AT value is set at 0.090, and preferably 0.080 or less taking manufacturability into consideration.

In the above-mentioned equation 1 and the below-mentioned equation 2, N, B, Ti, Zr, Nb, Al, O, each means the element content (% by mass).

$$PV=1.2Ti+0.8Zr+Nb+1.1Al+O\leq0.1 \quad \text{(equation 2)}$$

Ti, Zr, Nb, Al, and the like form carbonitride to cause deterioration of toughness after quenching, and thus the content is desirably reduced. Since these elements may sometimes form composite carbonitride and oxide, it is preferred to manage the PV value of equation 2, as well as each amount of these elements. When the PV value exceeds 0.1, quenching toughness deteriorates. Therefore, it is desired that the upper limit of the PV value is set at 0.1, and preferably 0.05 or less. There is no need to particularly set the lower limit of the PV value, and excessive reduction increases burden of a refining process, and thus it is preferred to set at 0.01 or more.

In the present invention, it is preferred to add, in addition to the above-mentioned elements, one or more kinds of 1.0% or less of Cu, 0.5% or less of Mo, and 0.3% or less of Sn.

Cu: 1.0% or less

Cu is often contained in the proportion of about 0.01% as inevitable impurities by mixing from scraps at the time of melting. Sometimes, Cu may be positively added as an austenite stabilizing element so as to improve hardenability. However, excessive addition leads to deterioration of hot workability and an increase in raw material cost, thus controlling the upper limit to 1.0% or less. Taking rusting due to acid rain into consideration, the lower limit is desirably set at 0.02% or more.

Mo: 0.5% or less

Mo may be added, as needed, since it is an element for enhancing temper softening resistance. In order to exert these effects, the lower limit is preferably set at 0.01%. Mo is a stabilizing element of a ferrite phase and excessive addition impairs quenching properties by narrowing of the single-phase austenite temperature region, and thus the upper limit is set at 0.5% or less. Since corrosion resistance required as a brake disc has already been ensured by balance between Cr and N, it is desired to set at 0.2% or less.

Sn: 0.3% or less

Sn may be added, as needed, since it is an element for enhancing temper softening resistance. In order to exert these effects, the lower limit is preferably set at 0.01%. Sn is a stabilizing element of a ferrite phase and excessive addition impair quenching properties by narrowing of the single-phase austenite temperature range, and thus the upper limit is set at 0.3% or less. Since corrosion resistance required as a brake disc has already been ensured by balance between Cr and N, it is desired to set at 0.1% or less.

Sb: 0.3% or less

Sb may be added in the proportion of 0.3% or less as an element for exerting the same operation and effect as those of Sn. The lower limit is preferably set at 0.005%.

Rare earth element (REM): 0.2% or less

REM is added, as needed, since it is effective to improve oxidation resistance. The lower limit is preferably set at 0.001%. Even if REM is added in the proportion of more than 0.20%, the effect is saturated and causes deterioration of corrosion resistance due to sulfide of REM, and thus the upper limit is set at 0.2%. Taking workability and production cost of the product into consideration, it is desired to set at 0.002% to 0.05%. In the present invention, REM is as defined in general definition and refers to the all-inclusive term of two elements scandium (Sc) and yttrium (Y) and fifteen elements (lanthanoid) from lantern (La) to lutetium (Lu). These elements may be added alone, or may be in the form of a mixture.

Ga: 0.3% or less

Ga may be added in the proportion of 0.3% or less so as to improve corrosion resistance. The lower limit is preferably controlled to 0.0002%, and more preferably 0.0020% or more.

There is no particular definition on other components in the present invention, and Ta, Bi, and the like may be added, as need, in the present invention. General harmful elements such as As and Pb, and impurity elements are preferably reduced as small as possible.

Heating conditions of quenching are as follows: the temperature is within a range from 950° C. to 1,050° C., the retention time is more than 0.1 and 5 seconds or less, and quenching is performed, and the duration from the start of heating up to the start of cooling is 50 seconds or less.

In order to control a fraction of a phase in which an IQ value becomes 4,000 or more by mapping analysis of EBSD to 1.0% or more and 15% or less, the austenite single phase structure should not be formed at the time of heating of quenching. Therefore, the upper limit of the heating temperature is preferably set at 1,050° C. or lower. On the other hand, when the heating temperature is lower than 950° C., quenched hardness cannot be obtained because of small austenite ratio, and thus the heating temperature is preferably set at 950° C. or higher. Just like the heating temperature, the retention time at the maximum heating temperature exerts significant influence on a phase fraction of ferrite and austenite of the quenched structure. There is a need to control the retention time at the heating temperature of quenching to more than 0.1 second and 5 seconds or less so as to adjust the fraction of a ferrite phase within a targeted range. Although appropriate range exists, when taking a change in structure in the heating temperature rising process into consideration, it is difficult to maintain a given heating rate. Therefore, it is efficient to control the duration from the start of heating up to the start of cooling and it is possible to evaluate while absorbing temperature change during heating and holding. The duration from the start of heating up to the start of cooling is set within 50 seconds or less from a temperature rise rate at the time of high frequency heating of quenching. When the duration becomes longer than 50 seconds, an austenite single phase structure is formed to cause deterioration of a brake disc. Rapid heating at a rate of more than 100° C./s is not preferable since consumption of facilities is accelerated, and thus the duration from the start of heating up to the start of cooling is desirably set at 10 second or more. Cooling after heating and retention is quenching. Cooling is performed at a cooling rate of 100° C./s or more. It is possible to perform quenching by die quenching.

Hardness defined in each claim can be realized by including components and a ferrite phase fraction disclosed in each claim.

EXAMPLES

The effects of the present invention will be described below by way of Examples, but the present invention is not limited to the conditions used in the following Examples.

In the present Example, first, a steel with the component composition shown in Table 1 was melted, followed by casting to obtain a slab. This slab was heated to 1,240° C. and the hot rolled at a finishing temperature within a range of 800 to 950° C. to obtain hot-rolled steel sheet having a thickness of 3.6 mm, which was coiled within a temperature range of 750 to 900° C. Using a box annealing furnace that can be heated to a temperature range of 800 to 900° C., annealing the hot-rolled steel sheet was performed, followed by furnace cooling to obtain a hot rolled and annealed sheet.

After removing scales of a surface of the hot rolled and annealed sheet by shot blasting, the sheet was press-formed into a disc having a diameter of 240 mm.

The disc was quenched under the below-mentioned predetermined conditions and, after final polishing (#80) of a surface of the disc, surface hardness was evaluated by a Rockwell C scale hardness tester. In order to evaluate quenching toughness of the disc, a Charpy impact test piece was made from the disc and an impact value was measured at room temperature (JIS Z 2242: "Charpy Test Method of Metallic Material"). With respect to the evaluation of corrosion resistance, after final polishing (#600) of the surface, a salt spray test was performed for 4 hours (JIS Z 2371: "Salt Spray Test Method") and a rust area ratio was measured. A cross section structure was measured by the EBSD method and an area ratio of a phase in which an IQ value becomes 4,000 or more by IQ value mapping was measured. The case where the quenched hardness HRC is 32 or more and 38 or less was rated "Pass". With respect to corrosion resistance, the case where the rust area ratio is 10% or less was rated "Pass". When the Charpy impact value is 50 J/cm$^2$ or more, the quenching toughness of the disc was rated "Pass".

A disc containing components of each number (No.) shown in Table 1 was heated by a high frequency induction heating device at about 80° C./s so that the IQ value of EBSD becomes 4,000 or more, and retained at a temperature range of 950 to 1,050° C. for more than 0.1 to 5 second or less, followed by die quenching and further cooling at a cooling rate of 100° C./s or more. The sample obtained finally was evaluated. The results are shown in Table 2.

"Steel No." shown in Table 3 corresponds to "No." shown in Table 1. Each sample was subjected to heating of quenching under heat treatment conditions shown in Table 3, followed by die quenching and further cooling at a cooling rate of 100° C./s or more. The quality of the samples obtained finally was evaluated.

For Comparative Examples, the same evaluation was performed on samples with the composition which is beyond the scope of the present invention, or heating conditions of quenching, or an area ratio in which the IQ value becomes 4,000 or more, which is beyond the scope of the present invention.

TABLE 1-1

| | No. | Content of component (% by mass) | | | | | | | | |
|---|---|---|---|---|---|---|---|---|---|---|
| | | C | Si | Mn | P | S | Cr | Ni | V | Nb |
| Examples of the present invention | 1 | 0.040 | 0.30 | 1.10 | 0.026 | 0.004 | 12.2 | 0.05 | 0.04 | 0.002 |
| | 2 | 0.042 | 0.31 | 1.08 | 0.025 | 0.005 | 12.3 | 0.06 | 0.04 | 0.001 |
| | 3 | 0.070 | 0.35 | 1.20 | 0.028 | 0.003 | 12.2 | 0.02 | 0.02 | 0.002 |
| | 4 | 0.030 | 0.28 | 1.15 | 0.027 | 0.006 | 12.3 | 0.06 | 0.01 | 0.003 |
| | 5 | 0.050 | 0.05 | 1.13 | 0.027 | 0.004 | 12.1 | 0.01 | 0.01 | 0.002 |
| | 6 | 0.045 | 0.25 | 1.10 | 0.025 | 0.003 | 12.3 | 0.05 | 0.04 | 0.001 |
| | 7 | 0.045 | 1.00 | 1.20 | 0.027 | 0.002 | 12.3 | 0.05 | 0.02 | 0.003 |
| | 8 | 0.042 | 0.31 | 1.00 | 0.027 | 0.006 | 12.0 | 0.04 | 0.03 | 0.003 |
| | 9 | 0.043 | 0.41 | 1.50 | 0.027 | 0.002 | 12.1 | 0.05 | 0.05 | 0.003 |
| | 10 | 0.051 | 0.35 | 1.12 | 0.027 | 0.003 | 12.2 | 0.07 | 0.03 | 0.000 |
| | 11 | 0.048 | 0.41 | 1.15 | 0.035 | 0.003 | 12.3 | 0.05 | 0.04 | 0.003 |
| | 12 | 0.052 | 0.50 | 1.12 | 0.025 | 0.015 | 12.2 | 0.03 | 0.07 | 0.001 |
| | 13 | 0.040 | 0.41 | 1.15 | 0.024 | 0.004 | 11.0 | 0.03 | 0.02 | 0.003 |
| | 14 | 0.051 | 0.42 | 1.21 | 0.026 | 0.003 | 14.0 | 0.02 | 0.01 | 0.003 |
| | 15 | 0.051 | 0.43 | 1.21 | 0.025 | 0.002 | 12.3 | 0.01 | 0.03 | 0.005 |
| | 16 | 0.041 | 0.41 | 1.09 | 0.027 | 0.006 | 12.4 | 0.50 | 0.02 | 0.010 |
| | 17 | 0.040 | 0.40 | 1.10 | 0.022 | 0.003 | 11.2 | 0.03 | 0.01 | 0.001 |
| | 18 | 0.042 | 0.39 | 1.01 | 0.027 | 0.005 | 12.5 | 0.02 | 0.001 | 0.003 |
| | 19 | 0.047 | 0.41 | 1.20 | 0.017 | 0.004 | 12.1 | 0.05 | 0.15 | 0.003 |
| | 20 | 0.048 | 0.42 | 1.25 | 0.027 | 0.003 | 12.2 | 0.05 | 0.001 | 0.100 |
| | 21 | 0.042 | 0.41 | 1.18 | 0.025 | 0.002 | 12.3 | 0.05 | 0.03 | 0.003 |
| | 22 | 0.038 | 0.41 | 1.10 | 0.026 | 0.002 | 12.1 | 0.05 | 0.04 | 0.015 |
| | 23 | 0.038 | 0.42 | 1.16 | 0.025 | 0.003 | 12.3 | 0.05 | 0.02 | 0.003 |

TABLE 1-1-continued

|  |  |  |  |  |  |  |  |  |  |  |
|---|---|---|---|---|---|---|---|---|---|---|
|  | 24 | 0.041 | 0.38 | 1.15 | 0.021 | 0.004 | 12.2 | 0.05 | 0.02 | 0.003 |
|  | 25 | 0.042 | 0.41 | 1.12 | 0.025 | 0.004 | 12.8 | 0.05 | 0.05 | 0.000 |
|  | 26 | 0.044 | 0.32 | 1.12 | 0.025 | 0.003 | 13.1 | 0.03 | 0.03 | 0.003 |
|  | 27 | 0.050 | 0.32 | 1.13 | 0.026 | 0.004 | 12.8 | 0.04 | 0.05 | 0.001 |
|  | 28 | 0.039 | 0.35 | 1.14 | 0.028 | 0.008 | 12.5 | 0.05 | 0.04 | 0.003 |
|  | 29 | 0.051 | 0.37 | 1.14 | 0.028 | 0.004 | 13.5 | 0.05 | 0.03 | 0.000 |
|  | 30 | 0.050 | 0.29 | 1.12 | 0.027 | 0.001 | 12.7 | 0.04 | 0.06 | 0.003 |
| Comparative | 31 | 0.085 | 0.45 | 0.80 | 0.025 | 0.003 | 12.2 | 0.05 | 0.04 | 0.001 |
| Examples | 32 | 0.041 | 1.10 | 1.10 | 0.026 | 0.003 | 12.1 | 0.05 | 0.03 | 0.003 |
|  | 33 | 0.042 | 0.03 | 1.50 | 0.025 | 0.005 | 12.3 | 0.04 | 0.03 | 0.002 |
|  | 34 | 0.040 | 0.31 | 0.90 | 0.025 | 0.010 | 12.2 | 0.03 | 0.06 | 0.002 |
|  | 35 | 0.020 | 0.32 | 1.60 | 0.024 | 0.005 | 12.5 | 0.02 | 0.05 | 0.003 |
|  | 36 | 0.041 | 0.31 | 1.10 | 0.036 | 0.004 | 12.5 | 0.01 | 0.02 | 0.002 |
|  | 37 | 0.050 | 0.32 | 0.80 | 0.021 | 0.020 | 12.6 | 0.03 | 0.02 | 0.003 |
|  | 38 | 0.043 | 0.31 | 1.21 | 0.021 | 0.003 | 10.5 | 0.03 | 0.03 | 0.003 |
|  | 39 | 0.041 | 0.32 | 1.21 | 0.021 | 0.003 | 14.5 | 0.03 | 0.03 | 0.002 |
|  | 40 | 0.042 | 0.31 | 1.32 | 0.028 | 0.005 | 12.5 | 0.00 | 0.02 | 0.003 |
|  | 41 | 0.044 | 0.33 | 1.32 | 0.026 | 0.003 | 12.5 | 1.00 | 0.04 | 0.002 |
|  | 42 | 0.045 | 0.30 | 1.21 | 0.025 | 0.003 | 12.6 | 0.05 | 0.000 | 0.002 |
|  | 43 | 0.046 | 0.30 | 1.21 | 0.025 | 0.006 | 12.4 | 0.04 | 0.20 | 0.002 |
|  | 44 | 0.045 | 0.32 | 1.21 | 0.025 | 0.003 | 12.4 | 0.06 | 0.03 | 0.11 |
|  | 45 | 0.041 | 0.32 | 1.22 | 0.024 | 0.002 | 12.3 | 0.03 | 0.05 | 0.002 |
|  | 46 | 0.042 | 0.32 | 1.21 | 0.025 | 0.003 | 12.4 | 0.02 | 0.04 | 0.002 |
|  | 47 | 0.042 | 0.31 | 1.21 | 0.025 | 0.004 | 12.5 | 0.03 | 0.02 | 0.003 |
|  | 48 | 0.041 | 0.32 | 1.32 | 0.026 | 0.003 | 12.6 | 0.02 | 0.03 | 0.003 |
|  | 49 | 0.051 | 0.36 | 1.32 | 0.025 | 0.003 | 12.6 | 0.03 | 0.03 | 0.002 |
|  | 50 | 0.048 | 0.34 | 1.21 | 0.025 | 0.005 | 12.7 | 0.06 | 0.03 | 0.003 |
|  | 51 | 0.049 | 0.35 | 1.32 | 0.025 | 0.004 | 12.4 | 0.05 | 0.02 | 0.002 |
|  | 52 | 0.047 | 0.32 | 1.32 | 0.027 | 0.003 | 13.2 | 0.05 | 0.08 | 0.002 |
|  | 53 | 0.030 | 0.15 | 1.10 | 0.026 | 0.003 | 12.3 | 0.02 | 0.02 | 0.003 |
|  | 54 | 0.070 | 0.32 | 1.50 | 0.027 | 0.004 | 12.4 | 0.02 | 0.02 | 0.003 |
|  | 55 | 0.048 | 0.28 | 1.30 | 0.028 | 0.003 | 12.6 | 0.02 | 0.02 | 0.003 |
|  | 56 | 0.043 | 0.35 | 1.50 | 0.026 | 0.005 | 12.6 | 0.02 | 0.02 | 0.080 |

|  |  | Content of component (% by mass) | | | | | | | | |
|---|---|---|---|---|---|---|---|---|---|---|
|  | No. | Ti | Zr | Ai | B | O | N | Others | C + 0.8(N-B) | PV |
| Examples | 1 | 0.002 | 0.002 | 0.004 | 0.0005 | 0.006 | 0.040 | — | 0.072 | 0.02 |
| of the | 2 | 0.002 | 0.003 | 0.004 | 0.0008 | 0.004 | 0.035 | — | 0.069 | 0.01 |
| present | 3 | 0.002 | 0.003 | 0.004 | 0.0015 | 0.005 | 0.026 | — | 0.090 | 0.02 |
| invention | 4 | 0.002 | 0.003 | 0.004 | 0.0012 | 0.006 | 0.033 | — | 0.055 | 0.02 |
|  | 5 | 0.002 | 0.003 | 0.004 | 0.0013 | 0.007 | 0.035 | — | 0.077 | 0.02 |
|  | 6 | 0.001 | 0.001 | 0.002 | 0.0012 | 0.005 | 0.045 | — | 0.080 | 0.01 |
|  | 7 | 0.002 | 0.003 | 0.004 | 0.0012 | 0.008 | 0.042 | — | 0.078 | 0.02 |
|  | 8 | 0.002 | 0.003 | 0.004 | 0.0008 | 0.005 | 0.035 | — | 0.069 | 0.02 |
|  | 9 | 0.002 | 0.003 | 0.004 | 0.0012 | 0.004 | 0.035 | — | 0.070 | 0.02 |
|  | 10 | 0.000 | 0.001 | 0.002 | 0.0015 | 0.005 | 0.040 | — | 0.082 | 0.01 |
|  | 11 | 0.002 | 0.003 | 0.004 | 0.0015 | 0.003 | 0.035 | — | 0.075 | 0.02 |
|  | 12 | 0.002 | 0.003 | 0.004 | 0.0014 | 0.002 | 0.045 | — | 0.087 | 0.01 |
|  | 13 | 0.002 | 0.003 | 0.004 | 0.0016 | 0.001 | 0.052 | — | 0.080 | 0.01 |
|  | 14 | 0.002 | 0.003 | 0.004 | 0.0021 | 0.005 | 0.048 | — | 0.088 | 0.02 |
|  | 15 | 0.002 | 0.003 | 0.004 | 0.0025 | 0.005 | 0.042 | — | 0.083 | 0.02 |
|  | 16 | 0.002 | 0.000 | 0.004 | 0.0012 | 0.004 | 0.035 | — | 0.068 | 0.02 |
|  | 17 | 0.001 | 0.001 | 0.002 | 0.0012 | 0.005 | 0.044 | — | 0.074 | 0.01 |
|  | 18 | 0.002 | 0.003 | 0.004 | 0.0008 | 0.003 | 0.039 | — | 0.073 | 0.02 |
|  | 19 | 0.002 | 0.003 | 0.004 | 0.0009 | 0.005 | 0.041 | — | 0.079 | 0.02 |
|  | 20 | 0.000 | 0.000 | 0.000 | 0.0007 | 0.000 | 0.042 | — | 0.081 | 0.10 |
|  | 21 | 0.05 | 0.003 | 0.003 | 0.0021 | 0.002 | 0.045 | — | 0.076 | 0.07 |
|  | 22 | 0.003 | 0.05 | 0.003 | 0.0025 | 0.006 | 0.039 | — | 0.067 | 0.07 |
|  | 23 | 0.025 | 0.003 | 0.05 | 0.0031 | 0.005 | 0.038 | — | 0.066 | 0.10 |
|  | 24 | 0.003 | 0.003 | 0.003 | 0.0002 | 0.004 | 0.039 | — | 0.072 | 0.02 |
|  | 25 | 0.003 | 0.003 | 0.003 | 0.0050 | 0.005 | 0.039 | — | 0.069 | 0.01 |
|  | 26 | 0.003 | 0.003 | 0.003 | 0.0021 | 0.008 | 0.041 | Sn: 0.05% | 0.075 | 0.02 |
|  | 27 | 0.003 | 0.003 | 0.003 | 0.0015 | 0.006 | 0.015 | — | 0.061 | 0.02 |
|  | 28 | 0.000 | 0.000 | 0.003 | 0.0008 | 0.005 | 0.060 | — | 0.086 | 0.01 |
|  | 29 | 0.003 | 0.003 | 0.003 | 0.0011 | 0.005 | 0.041 | Cu: 0.5% | 0.083 | 0.01 |
|  | 30 | 0.003 | 0.003 | 0.003 | 0.0021 | 0.005 | 0.051 | Mo: 0.5% | 0.089 | 0.02 |
| Comparative | 31 | 0.003 | 0.003 | 0.002 | 0.0008 | 0.005 | 0.030 | — | 0.108 | 0.01 |
| Examples | 32 | 0.002 | 0.002 | 0.003 | 0.0008 | 0.004 | 0.051 | — | 0.081 | 0.01 |
|  | 33 | 0.003 | 0.005 | 0.005 | 0.0008 | 0.015 | 0.021 | — | 0.058 | 0.03 |
|  | 34 | 0.005 | 0.003 | 0.003 | 0.0008 | 0.005 | 0.015 | — | 0.051 | 0.02 |
|  | 35 | 0.003 | 0.003 | 0.005 | 0.0008 | 0.004 | 0.021 | — | 0.036 | 0.02 |
|  | 36 | 0.003 | 0.005 | 0.003 | 0.0008 | 0.006 | 0.041 | — | 0.073 | 0.02 |
|  | 37 | 0.003 | 0.002 | 0.10 | 0.0008 | 0.005 | 0.025 | — | 0.069 | 0.12 |
|  | 38 | 0.005 | 0.002 | 0.003 | 0.0008 | 0.004 | 0.032 | — | 0.067 | 0.02 |
|  | 39 | 0.005 | 0.005 | 0.002 | 0.0008 | 0.005 | 0.047 | — | 0.078 | 0.02 |
|  | 40 | 0.003 | 0.003 | 0.005 | 0.0008 | 0.006 | 0.036 | — | 0.070 | 0.02 |
|  | 41 | 0.005 | 0.005 | 0.003 | 0.0008 | 0.004 | 0.037 | — | 0.073 | 0.02 |
|  | 42 | 0.003 | 0.003 | 0.002 | 0.0008 | 0.005 | 0.041 | Mo: 0.8% | 0.077 | 0.02 |

TABLE 1-1-continued

| 43 | 0.002 | 0.003 | 0.005 | 0.0008 | 0.005 | 0.040 | — | 0.077 | 0.02 |
| 44 | 0.003 | 0.003 | 0.005 | 0.0008 | 0.004 | 0.041 | — | 0.077 | 0.13 |
| 45 | 0.10 | 0.003 | 0.005 | 0.0008 | 0.006 | 0.045 | — | 0.076 | 0.14 |
| 46 | 0.02 | 0.10 | 0.003 | 0.0008 | 0.004 | 0.042 | — | 0.075 | 0.11 |
| 47 | 0.003 | 0.003 | 0.10 | 0.0008 | 0.005 | 0.070 | — | 0.070 | 0.12 |
| 48 | 0.005 | 0.002 | 0.003 | 0.0000 | 0.007 | 0.042 | Cu: 1.2% | 0.075 | 0.02 |
| 49 | 0.002 | 0.005 | 0.003 | 0.0060 | 0.005 | 0.039 | — | 0.077 | 0.02 |
| 50 | 0.003 | 0.005 | 0.003 | 0.0008 | 0.009 | 0.051 | — | 0.088 | 0.02 |
| 51 | 0.005 | 0.003 | 0.005 | 0.0008 | 0.004 | 0.010 | — | 0.056 | 0.02 |
| 52 | 0.003 | 0.002 | 0.005 | 0.0008 | 0.005 | 0.070 | — | 0.102 | 0.02 |
| 53 | 0.003 | 0.001 | 0.002 | 0.0003 | 0.003 | 0.020 | — | 0.046 | 0.01 |
| 54 | 0.003 | 0.002 | 0.003 | 0.0000 | 0.005 | 0.060 | — | 0.118 | 0.02 |
| 55 | 0.04 | 0.040 | 0.04 | 0.0008 | 0.003 | 0.030 | — | 0.071 | 0.13 |
| 56 | 0.01 | 0.010 | 0.002 | 0.0006 | 0.008 | 0.056 | — | 0.087 | 0.11 |

TABLE 2-1

| | No. | Quenched hardness (HRc) | EBSP Area where IQ ≥ 4,000 (%) | Charpy impact value (J/cm$^2$) | Salt spray test | Others properties |
|---|---|---|---|---|---|---|
| Examples of the present invention | 1 | 34.8 | 1.5 | 53 | Pass | |
| | 2 | 34.5 | 1.6 | 51 | Pass | |
| | 3 | 37.9 | 1.8 | 52 | Pass | |
| | 4 | 32.0 | 2.5 | 53 | Pass | |
| | 5 | 35.8 | 3.5 | 60 | Pass | |
| | 6 | 35.2 | 1.1 | 51 | Pass | |
| | 7 | 35.9 | 2.5 | 52 | Pass | |
| | 8 | 34.5 | 15.0 | 50 | Pass | |
| | 9 | 34.6 | 2.1 | 51 | Pass | |
| | 10 | 35.1 | 2.5 | 52 | Pass | |
| | 11 | 35.4 | 1.9 | 52 | Pass | |
| | 12 | 37.5 | 2.5 | 50 | Pass | |
| | 13 | 36.3 | 5.4 | 53 | Pass | |
| | 14 | 37.6 | 2.6 | 51 | Pass | |
| | 15 | 36.7 | 2.8 | 52 | Pass | |
| | 16 | 34.2 | 5.5 | 60 | Pass | |
| | 17 | 33.1 | 1.1 | 65 | Pass | |
| | 18 | 35.0 | 2.5 | 68 | Pass | |
| | 19 | 36.1 | 2.6 | 65 | Pass | |
| | 20 | 36.5 | 2.4 | 52 | Pass | |
| | 21 | 35.7 | 4.1 | 54 | Pass | |
| | 22 | 34.1 | 1.6 | 78 | Pass | |
| | 23 | 33.9 | 7.4 | 74 | Pass | |
| | 24 | 34.9 | 8.2 | 65 | Pass | |
| | 25 | 34.4 | 1.5 | 65 | Pass | |
| | 26 | 35.4 | 8.9 | 51 | Pass | |
| | 27 | 32.5 | 1.5 | 52 | Pass | |
| | 28 | 37.4 | 15.0 | 56 | Pass | |
| | 29 | 36.8 | 1.5 | 52 | Pass | |
| | 30 | 37.8 | 6.5 | 54 | Pass | |
| Comparative Examples | 31 | 40.3 | 0.0 | 35 | Pass | |
| | 32 | 31.5 | 21.0 | 20 | Pass | |
| | 33 | 32.5 | 5.2 | 15 | Pass | |
| | 34 | 31.4 | 16.0 | 55 | Pass | Surface flaw of hot rolled steel plate |
| | 35 | 28.8 | 0.5 | 60 | Failure | |
| | 36 | 35.1 | 1.6 | 25 | Pass | |
| | 37 | 34.5 | 1.5 | 48 | Failure | |
| | 38 | 34.1 | 2.5 | 52 | Failure | |
| | 39 | 31.0 | 16.0 | 52 | Pass | |
| | 40 | 30.8 | 17.0 | 53 | Pass | |
| | 41 | 31.8 | 0.0 | 54 | Pass | |
| | 42 | 28.0 | 1.5 | 60 | Pass | |
| | 43 | 31.0 | 5.2 | 45 | Pass | |
| | 44 | 35.8 | 3.6 | 25 | Pass | |
| | 45 | 35.7 | 2.6 | 35 | Pass | |
| | 46 | 35.4 | 4.6 | 41 | Pass | |
| | 47 | 34.6 | 7.8 | 28 | Pass | |
| | 48 | 35.4 | 5.9 | 60 | Pass | Surface flaw of hot rolled steel plate |
| | 49 | 35.8 | 9.5 | 65 | Failure | |
| | 50 | 37.7 | 5.5 | 28 | Pass | |
| | 51 | 28.0 | 6.8 | 70 | Pass | |
| | 52 | 40.1 | 7.8 | 75 | Pass | |
| | 53 | 31.5 | 17.0 | 65 | Pass | |

TABLE 2-1-continued

| No. | Quenched hardness (HRc) | EBSP Area where IQ ≥ 4,000 (%) | Charpy impact value (J/cm²) | Salt spray test | Others properties |
|---|---|---|---|---|---|
| 54 | 41.3 | 0.2 | 25 | Pass | |
| 55 | 35.6 | 1.5 | 32 | Pass | |
| 56 | 32.6 | 5.5 | 25 | Pass | |

TABLE 3

| | Symbol | Steel No. | Heat treatment conditions | | | Quenched hardness (HRC) | EBSP Area where IQ ≥ 4,000 (%) | Charpy impact value (J/cm²) | Salt spray test |
|---|---|---|---|---|---|---|---|---|---|
| | | | Temperature (° C.) | Retention time (s) | Heating and retention time (s) | | | | |
| Examples of the present invention | A1 | 1 | 950 | 1 | 39 | 32 | 15.0 | 62.0 | Pass |
| | A2 | 1 | 950 | 5 | 43 | 35 | 10.0 | 52.0 | Pass |
| | A3 | 1 | 1000 | 1 | 41 | 35 | 5.0 | 61.0 | Pass |
| | A4 | 1 | 1000 | 5 | 45 | 36 | 4.0 | 70.0 | Pass |
| | A5 | 9 | 1050 | 1 | 43 | 37 | 2.0 | 56.0 | Pass |
| | A6 | 9 | 1050 | 5 | 47 | 38 | 1.0 | 74.0 | Pass |
| Comparative Examples | a1 | 1 | 1000 | 11 | 51 | 38 | 0.5 | 20.0 | Pass |
| | a2 | 1 | 1050 | 60 | 102 | 38 | 0.0 | 15.0 | Pass |
| | a3 | 31 | 950 | 5 | 43 | 40 | 5.0 | 31.0 | Pass |
| | a4 | 34 | 950 | 5 | 43 | 37 | 3.0 | 58.0 | Failure |
| | a5 | 1 | 900 | 5 | 41 | 28 | 20.0 | 85.0 | Pass |
| | a6 | 1 | 1150 | 1 | 47 | 38 | 0.0 | 8.5 | Pass |
| | a7 | 40 | 950 | 5 | 43 | 38 | 4.0 | 40.0 | Pass |
| | a8 | 1 | 1050 | 0 | 42 | 31 | 18.0 | 56.0 | Pass |

As is apparent from Tables 1 and 2, in examples of the present invention, which have the component composition to which the present invention is applied, and the ferrite phase fraction in which an IQ value of EBSD is discriminated as 4,000 or more, quenched hardness (HRC), toughness after quenching (Charpy impact value), and corrosion resistance were satisfactory, and also surface defect of hot strip was not recognized.

Each steel, in which the other component composition is the same as that of Example No. 26 of the present invention, except that Sb (0.05%), REM (0.01%), or Ga (0.003%) is contained in place of a Sn component of the steel composition of Example No. 26 of the present invention, was melted. Then, a disc-shaped sample was produced from each of the melted steels under the same production conditions as those of Example No. 26 of the present invention, except for the component composition. With respect to these samples, the same evaluation items shown in Table 2 were evaluated. The results revealed that these samples have the same properties as those of Example No. 26 of the present invention.

Meanwhile, as shown in Table 3, in Comparative Examples in which the heating condition of quenching or the retention time is beyond the scope of the present invention, a ferrite phase fraction in which an IQ value becomes 4,000 or more is beyond the scope of the present invention, and at least any one of quenched hardness, Charpy impact value, corrosion resistance, and surface flaw was rated "failure". The above fact reveals that brake discs in Comparative Examples are inferior in properties.

Specifically, in Nos. 31, 34, 35, and 52 to 54, since the AT value of equation 1 is less than 0.055 and more than 0.090, quenched hardness was beyond the targeted range. Nos. 37, 44 to 47, and 55 to 56 exhibited low toughness after quenching since the PV value was more than 0.1. Nos. 32 and 39 exhibited low quenched hardness because of high Si and Cr contents. No. 36 exhibited poor toughness because of high P content. No. 38 exhibited poor corrosion resistance because of low Cr content.

The ferrite area ratio exceeded 15% or less than 1.0 because of low or excessive Ni content, and thus Nos. 40 and 41 exhibited poor quenched hardness. No. 43 exhibited low quenched hardness because of high V content. In No. 49, $M_{23}(CB)_6$ was precipitated to cause deterioration of corrosion resistance because of high B content. No. 51 exhibited low quenched hardness because of low N content. In No. 34, S was segregated to austenite grain boundary at the time of heating for hot rolling to cause surface defect of hot strip because of low Mn content. In No. 48, because of high Cu content, segregation of Cu to grain boundary at the time of heating for hot rolling caused deterioration of hot workability and caused surface defect of hot strip.

In symbols a1, a2, a5, a6, and a8 shown in Table 3, maximum heating temperature at the time of heating of quenching was lower than 950° C. and higher than 1,050° C., or the retention time is absent or the retention time is more than 5 second, and the duration from the start of heating up to the start of cooling (heating and holding time) exceeded 50 second, and thus the ferrite fraction became less than 1% or more than 15%, and any one of quenched hardness, Charpy impact value, and corrosion resistance evaluated by a salt spray test was rated "Failure". In a3, a4, and a7, since steel components were beyond the scope of the present invention, properties did not attain satisfaction and rated "Failure" even if production conditions of a brake disc fall within the scope of the present invention.

These results could reveal the above-mentioned findings, and also could support the reason for limitation of the above-mentioned each steel composition and construction.

INDUSTRIAL APPLICABILITY

As is apparent from the above description, the brake disc of the present invention is a brake disc in which optimization of the structure evaluated by the EBSD method is attained by control of heating conditions of quenching to obtain satisfactory toughness, and can realize a high-quality brake disc free from deterioration of corrosion resistance by optimization of the nitrogen content even though having a two phase structure. In particular, application of a molded article produced by the production method of the present invention to motorbike and bicycle brake discs enables prolonging of lifetime of parts, thus making it possible to enhance the degree of social contribution. In other words, the present invention sufficiently has industrial applicability.

The invention claimed is:

1. A stainless steel brake disc comprising, in % by mass, a stainless steel comprising 0.030 to 0.080% of C, 0.05% to 1.0% of Si, 1.0 to 1.5% of Mn, 0.035% or less of P, 0.015% or less of S, 11.0 to 14.0% of Cr, 0.01 to 0.50% of Ni, 0.001 to 0.15% of V, 0.10% or less of Nb, 0.05% or less of Ti, 0.05% or less of Zr, 0.05% or less of Al, 0.015 to 0.060% of N, 0.0002% or more and 0.0050% or less of B, and 0.0080% or less of O, wherein an AT value of equation 1 is 0.055 or more and 0.090 or less, equation 2 is satisfied, the balance of the stainless steel is Fe and inevitable impurities, a ferrite phase fraction of the stainless steel, defined by the fact that an image quality value of an electron backscatter diffraction (EBSD) pattern is 4,000 or more, and said ferrite phase fraction is 1% or more and 15% or less of the stainless steel, and surface hardness of the stainless steel is 32 HRC or more and 38 HRC or less:

$$AT = C + 0.8(N-B) \tag{1}$$

$$PV = 1.2Ti + 0.8Zr + Nb + 1.1Al + O \leq 0.1 \tag{2}$$

where N, B, Ti, Zr, Nb, Al, and O in equation 1 and equation 2 each means the element content (% by mass).

2. The stainless steel brake disc according to claim 1, further comprising, in % by mass, one or two or more of 1.0% or less of Cu, 0.5% or less of Mo, 0.3% or less of Sn, 0.3% or less of Sb, 0.2% or less of rare earth elements, and 0.3% or less of Ga.

3. A method for producing a stainless steel brake disc comprising, in % by mass, a stainless steel comprising 0.030 to 0.080% of C, 0.05% to 1.0% of Si, 1.0 to 1.5% of Mn, 0.035% or less of P, 0.015% or less of S, 11.0 to 14.0% of Cr, 0.01 to 0.50% of Ni, 0.001 to 0.15% of V, 0.10% or less of Nb, 0.05% or less of Ti, 0.05% or less of Zr, 0.05% or less of Al, 0.015 to 0.060% of N, 0.0002% or more and 0.0050% or less of B, and 0.0080% or less of O, wherein an AT value of equation 1 is 0.055 or more and 0.090 or less, equation 2 is satisfied, and the balance of the stainless steel is Fe and inevitable impurities, said method comprises the steps of:

heating said stainless steel to a temperature of 950° C. or more and 1050° C. or lower;

retaining at a heating temperature for more than 0.1 second and 5 seconds or less;

cooling at a cooling rate of 100° C./s or more; and setting a duration from the start of heating up to the start of cooling of 50 seconds or less:

$$AT = C + 0.8(N-B) \tag{1}$$

$$PV = 1.2Ti + 0.8Zr + Nb + 1.1Al + O \leq 0.1 \tag{2}$$

where N, B, Ti, Zr, Nb, Al, and O in equation 1 and equation 2 each means the element content (% by mass).

4. The method for producing a stainless steel brake disc according to claim 3, further comprising, in % by mass, one or two or more of 1.0% or less of Cu, 0.5% or less of Mo, 0.3% or less of Sn, 0.3% or less of Sb, 0.2% or less of rare earth elements, and 0.3% or less of Ga.

* * * * *